March 11, 1941.  H. T. JENKINS  2,234,865
RAKE
Filed July 25, 1939  2 Sheets-Sheet 1
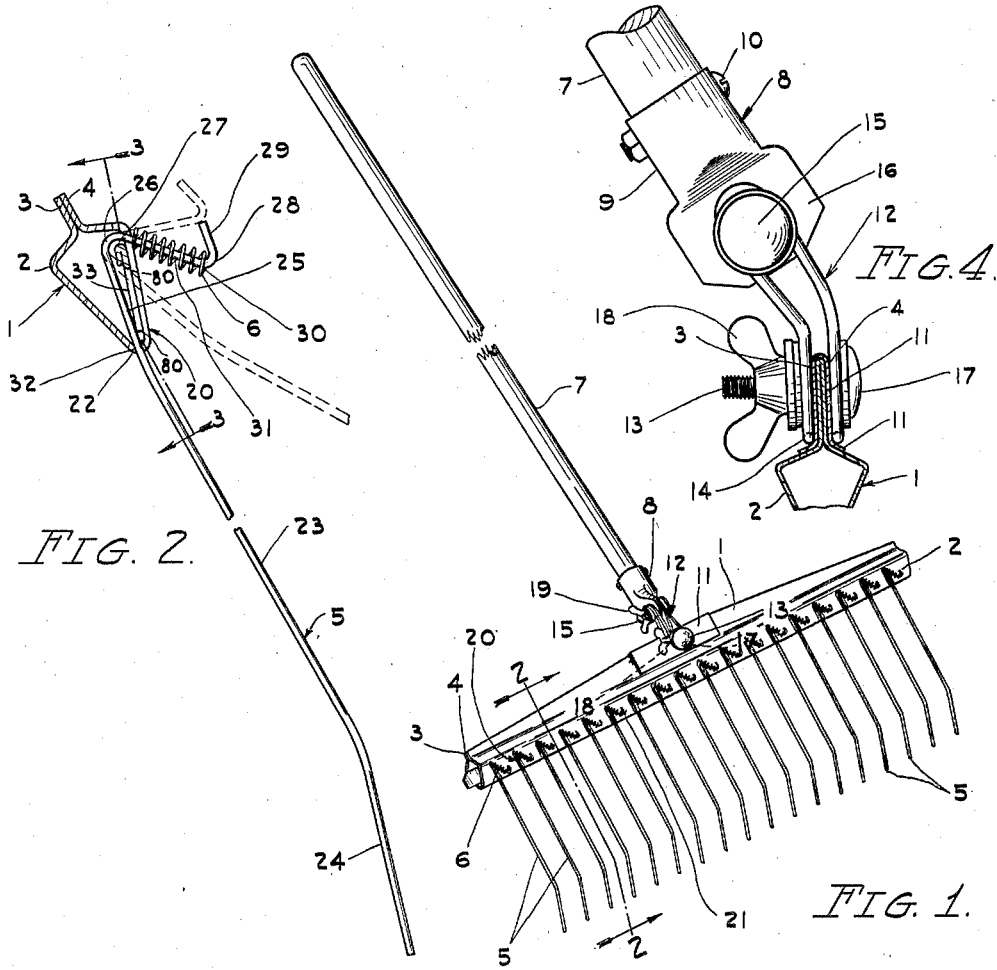
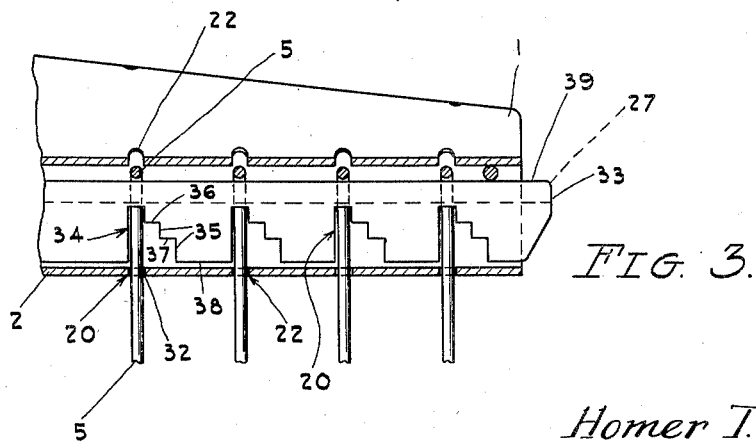
INVENTOR.
Homer T. Jenkins
BY Cox & Moore
ATTORNEYS.

March 11, 1941. H. T. JENKINS 2,234,865
RAKE
Filed July 25, 1939 2 Sheets-Sheet 2
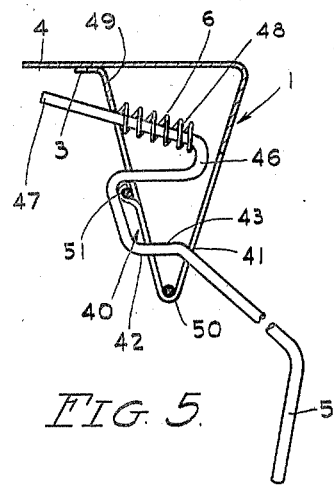
FIG. 5.
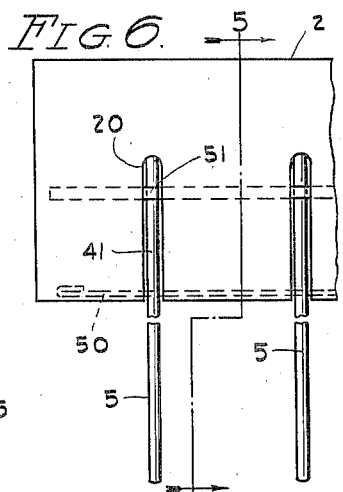
FIG. 6.
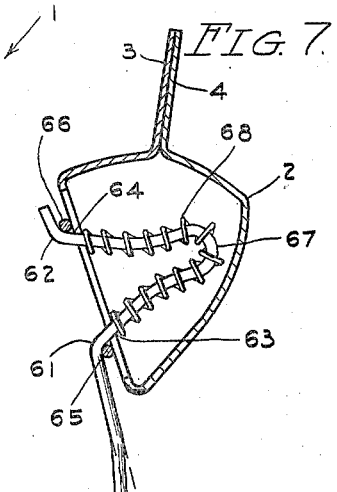
FIG. 7.
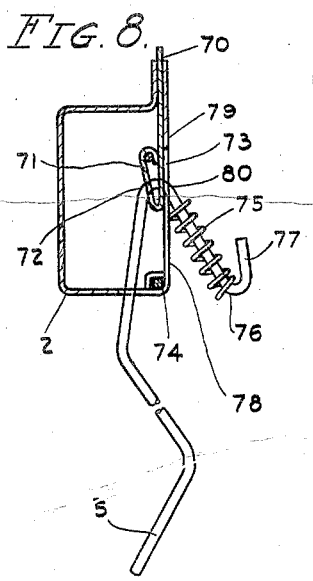
FIG. 8.
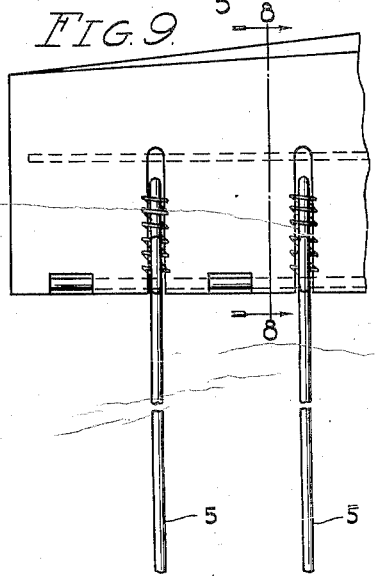
FIG. 9.
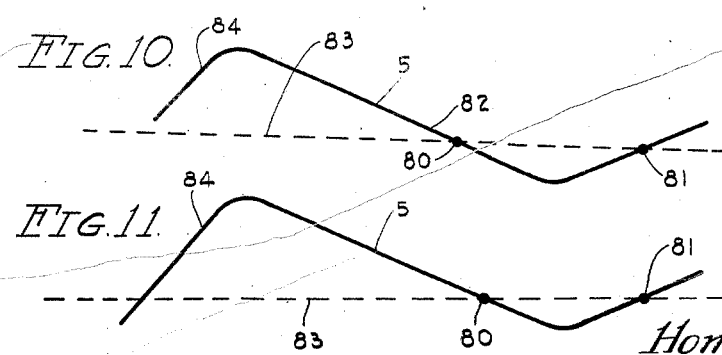
FIG. 10.
FIG. 11.
INVENTOR.
Homer T. Jenkins
BY Cox & Moore
ATTORNEYS.

Patented Mar. 11, 1941

2,234,865

UNITED STATES PATENT OFFICE 2,234,865

RAKE

Homer T. Jenkins, Chicago, Ill.

Application July 25, 1939, Serial No. 286,349

9 Claims. (Cl. 56—400.17)

This invention relates to rakes and particularly to that type of rake which is used with a sweeping action.

An important object of the invention is to provide a rake provided with improved means for flexibly supporting the prongs or teeth of the rake so that during use of the rake, should it come in contact with a raised element, the teeth coming in contact with that element will be raised without affecting the position of the other teeth or prongs.

Another object of the invention is to provide a rake having a plurality of pivotally supported, spring tensioned teeth or prongs, there being improved means provided to vary the spring tension on the pivotally supported teeth or prongs.

A further object of the invention is to provide a rake having a head or frame upon which there is supported a plurality of prongs or teeth resiliently urged and maintained in a predetermined position by spring means; which effect a constant urge on the teeth or prongs to maintain them in a predetermined position, there being adjustable means movable with respect to a part of the head or frame so as to cause an operation to become effected on the teeth whereby the spring tension on the teeth may be varied.

A still further object of the invention is the provision of a rake having a plurality of pivotally mounted, spring-urged teeth or prongs, the teeth or prongs being constructed in a predetermined manner and characterized in that the teeth are bent or deformed so as to cause the teeth to be maintained in proper operable position and preventing roll movement or side sway of the teeth when the rake is used.

An additional object of the invention is the provision of new and improved means for adjustably securing a handle to the rake body or frame, whereby the handle may be shifted through various angular positions with respect to the head or frame, there being new and improved means for locking the handle in adjusted position.

Numerous other objects and advantages will be apparent throughout the progress of the following specification.

The accompanying drawings illustrate certain selected embodiments of the invention and the views therein are as follows:

Fig. 1 is a perspective view of one form of an improved rake embodying the invention;

Fig. 2 is a detail sectional view on the line 2—2 of Fig. 1;

Fig. 3 is a detail sectional view on the line 3—3 of Fig. 2;

Fig. 4 is a detail view of the improved means for adjustably securing the handle to the rake head or frame;

Fig. 5 is a detail sectional view of a modified form of rake taken on the line 5—5 of Fig. 6;

Fig. 6 is a detail elevational view of the rake head and embodying the construction disclosed in Fig. 5;

Fig. 7 is a detail sectional view showing another modified form of providing the resilient or spring action to the rake teeth or prongs;

Fig. 8 is a detail sectional view on the line 8—8 of Fig. 9 showing another modified form of rake including spring means located in a different position for providing the resilient action and having means for bearing the spring action;

Fig. 9 is a detail plan view of the rake head of the structure shown in Fig. 8; and Figs. 10 and 11 are schematic sketches illustrating a principle of the invention.

The rakes herein illustrated for the purpose of describing the invention each comprise a rake head or frame 1, which is preferably formed from sheet-metal and bent to the desired form or configuration so as to provide a longitudinal tubular member 2. The tube 2 may be stamped from a single piece of metal, the free ends 3 and 4 of which may extend outwardly in parallelism and may in some instances be fastened together, as shown in Figs. 2, 5 and 7. A plurality of spaced teeth or prongs 5 are flexibly secured to the tube 2 by various methods, and spring means 6 are provided for urging the prongs in a predetermined direction and holding them in proper operable position.

A handle 7 is operatively fastened to the head 1 by means of an adjustable connection 8. The adjustable connection 8, Fig. 4, comprises a tubular ferrule or sleeve 9, which is preferably formed from a single piece of sheet-metal to provide a stem portion into which the handle 7 fits. A pin, screw, or other fastening element 10 passes through the ferrule or sleeve 9 and through the end of the handle 7 and securedly locks the handle 7 in position. A reinforcing strip 11 is fixed to the head or frame 1, such as by welding or otherwise, and extends along the sides of the extensions 3 and 4 of the tubular member 2, Fig. 4. A connecting member 12 connects the ferrule or sleeve 9 to the upstanding member 11, there being a hole through the member 11 and through the extensions 3 and 4 to receive a bolt member 13. The connecting member 12 may comprise a single member made of wire, with the free ends 14 of the wire arranged at the lower end of the connecting member and engaging the reinforcing member 11. The wire commences at a point indicated at 14, extends upwardly and in preferable engagement with the side of the bolt 13, and then around a bolt 15, which passes through a flattened portion 16 of the ferrule or sleeve 9. The wire member then continues around the bolt member 15 and downwardly around the bolt 13, encircling head 17 of the bolt 13. It then continues upwardly around the opposite side of the bolt 15 and then downwardly, paralleling the free end 14, the last named free end engaging the edge of the bolt 13. The free ends are locked in position by a thumb nut 18, Fig. 4, while the upper looped ends of the member 12 are locked by a thumb nut 19, Fig. 1, which locks the upper looped ends of the member 12 in position with respect to the ferrule member 9 and the handle 7. By loosening the thumb nut 19, Fig. 1, the handle may be moved throughout various angular positions about a pivot point, which pivot point is the bolt 15. The head 1 comprising the tube 2, to which the prongs 5 are attached, may be shifted throughout various angular positions by loosening the thumb nut 18. The head is locked in adjusted position by tightening the thumb nut 18, while the handle is locked in adjusted position by tightening the thumb nut 19.

Referring to Figs. 1 to 4, the head 1 is provided with a plurality of spaced slots 20 extending along the outer face 21 of the tube 2. These slots extend down a predetermined distance along the lower edge of the tube 2 as indicated at 22, Fig. 2. The teeth or prongs 5 of the rake are provided with an intermediate straight portion 23 and a lower portion 24, which inclines downwardly with respect to the straight portion 23. The upper portion of each prong is provided with a relatively straight portion 25, which extends upwardly at an angle with respect to the portion 23. The extreme upper part of each prong or tooth 5 is bent at 26, Fig. 2, about a fulcrum 27. The extreme end 28 projects outwardly and is hooked at its end as indicated at 29, Fig. 2. Spring means 6 in the form of a coil spring 30 encircles an outwardly extending portion 31 of the tooth and is confined between the hooked end 29 and the outer surface of the tubular member 2, thereby tending to urge the prongs in a downward position against a ledge 32 at the lower end of the slot 22. Each tooth or prong, therefore, is free to operate about the fulcrum 27, being positioned in the slot 22, thereby permitting each tooth or prong to operate upwardly with respect to the tubular member against the urging action of the coil spring 30.

A plate 33, Fig. 3, is arranged inside of the tube 2 against an inner face thereof and has a bent-over portion which comprises the fulcrum 27. This plate 33 is slidable longitudinally within the tube 2 and is provided with a cut-out 34, Fig. 3, there being one cut-out for each prong 5. The cut-out is juxtaposed with respect to the slot 22 so that each prong 5 may operate through the slot 22 and through the cut-out 33. One side of the cut-out is provided with step portions 35 so that one of the edges 36 and 37, or the bottom 38 of the slidable plate member 33 may be brought in position with respect to the slots or openings 22 and thereby limit the size of the slot. When the member 33 is shifted, the movement through the slot 22 will, therefore, be restricted, but the prong will still have pivotal movement vertically because a pressure on the end 24 of the tooth 5 from the left, Fig. 2, such as when the rake is being used, will permit the part of the prong which extends outwardly from the tube to move to the right, Fig. 2. Such movement of the upper part of the teeth will be against the compression of the helical spring 30 and will create a greater spring tension on the prongs, because the movement of the prongs in the slots 22 is restricted and the fulcrum movement is increased by the movement of the normal external part of the teeth swinging within the tube 2. The plate 33 is of such length that the portion 39, Fig. 3, extends outwardly from the head or frame 1 a predetermined distance. When it is desired to limit the movement of the prongs, the member 39 is moved, by hammering or otherwise, to the left, Fig. 3, so that shoulders 36 and 37, or the lower end 38, will cover the slot 22 and thereby cause a somewhat restricted movement of the prongs, but giving the prongs a greater spring action, thereby tending to make the action of the prongs stiffer. By the operation of the plate, therefore, various spring pressures and movements of the prongs are effected. The rake, therefore, is capable of various uses.

Referring to Figs. 5 and 6, each prong 5 extends through a slot 20 and through a corresponding slot 40 on the opposite side of the tube 2, the prong being bent at 41 and 42, providing a portion 43 which is arranged inside of the tube. The prong is also bent at 44 to provide a relatively straight portion 45 which extends outwardly of the slot. The outer, upper end of the prong is curved as indicated at 46 and has an extreme extending portion 47 which extends outwardly of the elongated slot 40. The spring 6 is in the form of a helical spring 48 and extends around the stem portion 47 of the prong, being confined between the curved portion 46 and inside wall 49. Longitudinal members, such as wires, 50 and 51 are arranged in the bottom and along the inner side, respectively, of the tube 2 and provide the fulcrum points or limiting positions of the prongs, the member 51 being the fulcrum member and the member 50 being the limiting member. The spring 48, therefore, tends to urge the hook 46 toward the inner wall of the tube 2, Fig. 5, and, consequently, the lower end of the prong in a downward position, whereby a spring pressure is exerted against the prongs during the operation. This spring tension is sufficient to permit the prongs to be maintained in a normal plane, but if a rock or other obstruction should occur, the prongs engaging the obstruction will be the only ones which will raise out of the normal plane.

The construction shown in Fig. 7 comprises the tubular member 2, with a longitudinal slot 60 formed at one side. The prong 5 is bent at 61 and 62 to provide sides 63 and 64, respectively, which engage longitudinal wires 65 and 66. These wires provide a fulcrum for each prong 5, as well as maintain the prong in position. The part of the prong intermediate the portions 63 and 64 is bent around at 67, and a coil spring 68 extends around this portion and is limited by the inside walls of the member 2 surrounding the slot 60. Therefore, when the rake is operated, the spring 68 provides an urging action on each prong but permits free movement of the prongs against the urging action of the spring.

The construction shown in Figs. 8 and 9 is similar to the construction shown in Figs. 1 to 4, but instead of a horizontally sliding plate, such as the member 33, a vertically sliding plate 70 is provided. The vertically sliding plate 70 includes a returned portion 71, which is provided with slots 72 corresponding in position with slots 73 formed in the wall of the member 2. A wire 74 is provided in one corner and it is about this wire that the prongs 5 operate, the said member 74 and the lower edge of the slot 72 acting as a fulcrum. Therefore, when an obstruction is engaged by one or more of the prongs or teeth 5, the prongs are free to move to the right, Fig. 8, against the tension of a coil spring 75, which engages a part 76 of the prongs which extend outwardly from the tube 2. The coil spring 75 is maintained in position by a hook 77 and the outer face of the tube 2. To limit the vertical movement of the teeth 5, Figs. 8 and 9, the plate member 70 is moved downwardly, thereby obstructing slots 78. The parts 72 have a wire 79 provided therein, which, when the plate 70 is moved downwardly, is caused to extend across the face of the slots 78. This arrangement, while cutting down the size of the slots, will permit a slidable movement of the bent end 80 of the prongs, causing a greater spring tension to be applied without materially limiting the swinging or pivotal movement of the prongs.

The teeth or prongs 5 are arranged within separate openings or slots which act as guideways. Each tooth or prong 5 has a fulcrum point, a point against which the spring exerts urging action and a contact point against which the spring forces the tooth in normal or rest position. Each tooth is so constructed that its outer free end portion does not cross a line drawn between the fulcrum point and the point against which the spring exerts its urging action. In Fig. 10 the fulcrum point is designated at 80, while the point at which the spring exerts its urging action is indicated at 81. The straight line 83 is drawn between the points 80 and 81, and it will be noted that the working end or free end portion 84 of the tooth or prong does not cross the line 83 but terminates short of this line. In Fig. 11 the line 83 drawn between the pivot point 80 and the spring contact point 81 is crossed by the end portion 84 of the prong 5. If the prong be pivoted and the spring connected, as shown in Fig. 11, the dragging of the ends of the prongs along the ground causes the prongs to tend to rotate about an axis represented by the line 83. If, however, the end portion 84 of the prong does not cross the line 83, as shown in Fig. 10, there will be no tendency for the prong to rotate about such an axis as represented by the line 83. Therefore, by constructing and mounting the prongs according to the principle shown in Fig. 10, any tendency of the prongs to turn abount a longitudinal axis is avoided. The fulcrum point and the point at which the spring applies its urging action may be relatively reversed; for example, the prong may be pivoted at the point 81 and the spring connected to the prong to exert its urging action at the point 80. The spring may, of course, be either a spring normally under compression or normally under tension. The configuration or shape of the tooth or prong between the points 80 and 81 is not of significance, the essential requirement being that the line drawn through the point against which the spring exerts its urging action on the prong and the fulcrum of the prong be not crossed at any point by the end portion 84 of the tooth or prong. For example, it may have any of the shapes shown in the various Figs. 1 to 9, provided only that the free end portion of the prong does not cross a line drawn between the pivot point and the point at which the spring exerts its urging action on the prong, or does not cross an extension of such line.

The invention provides a rake which is adapted to be used in regular raking action, or with a sweeping action in a manner similar to that in which a broom is used. Such a sweeping action is particularly advantageous for raking lawns. The particular construction of the teeth is such that all tendency of the teeth to turn in their respective slots is eliminated. This tooth construction is characterized in that the teeth are formed in the shape of a crank and, therefore, will pull easily without any turning movement. The teeth are relatively flexible and are free to move against the urging action of the springs, and, therefore, when an obstruction is encountered, those teeth which engage the obstruction are free to rise out of position, while the other teeth will retain their normal position. The particular rake is further characterized in that it includes a plate shiftable either longitudinally or vertically so as to change the fulcrum of the pivotally positioned teeth and provide a stiffer spring action on the prongs. The head and handle are connected together by an adjustable connecting element, whereby the handle may be moved vertically throughout various angles with respect to the normal position of the teeth. Also the connecting member is adjustable with respect to the head of the rake so that the angle between the handle and the rake head may be varied to a considerable extent. The handle, therefore, has in effect two adjustments with respect to the rake head.

It should be noted that the present invention provides a connection between a tine and the supporting frame of the rake comprising diverging portions embracing a fulcrum which may be adjustable in width to limit the arcuate movement of the tine about the fulcrum. Thus, it will be seen, in the embodiment disclosed in Figures 1 and 3, that the effective fulcrum comprises a portion of the plate 33 which is located opposite the slot in which the tine is disposed. It will be seen that, in accordance with the meaning and intention of the present disclosure, the fulcrum comprises the entire width of the plate adjacent which the diverging portions of the tine contact. In order to better understand the invention, it will be appreciated that when in operation, when a substantial force acts against the lower part of the tine to urge it to the right, as viewed in Figure 2, the lower portion of the tine impinges the lower edge of the plate, while the upper portion of the tine is drawn inwardly against the tension of the coil spring. As the angularity of the lower portion thus increases with respect to the lower edge of the plate, it tends to slide therealong so that the entire tine shifts or floats generally arcuately about the fulcrum abutment. From the foregoing, it will be obvious that increasing the effective width of the abutment adjustability limits the shiftable movement of the tine since the plate occupies a relatively increasing width of the bight between the diverging portions. It will be furthermore appreciated that, by using a compression coil spring as shown in Figure 2, the spring tension increases toward a point where the convolutions of the spring reside axially against each other to provide a substantially rigid abutment. Thus, the spring cooperates with the plate to positively limit the shifted position of the tine. In accordance with the foregoing, it will be noted that in Figure 8 the bar 74 in the lower edge of the slot 72 and the shiftable member 70, together form the fulcrum, the effective width of which, with respect to the slot, may be adjustably varied by vertically shifting the member 70 as hereinbefore pointed out.

The invention further provides a rake which is composed of few and simple parts, which may be readily and economically manufactured and assembled.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A rake comprising a frame having a plurality of tines projecting therefrom and disposed longitudinally of said frame, each tine having an inner section comprising portions extending through said frame, said frame being slotted to receive said sections, each section comprising one portion extending through said slot in a predetermined direction and a second portion extending from said first named portion at a diverging angle with respect thereto and projecting through said slot, fulcrum means associated with said frame adjacent said slot and received in the bight between said angularly disposed portions for permitting said portions to shift about said fulcrum in the slot, and resilient means acting between said frame and said second portion for urging said bight against the fulcrum.

2. A rake comprising a frame having a plurality of tines projecting therefrom and disposed longitudinally of said frame, each tine having an inner section comprising portions extending through said frame, said frame being slotted to receive said sections, each section comprising one portion extending through said slot in a predetermined direction and a second portion extending from said first named portion at a diverging angle with respect thereto and projecting through said slot, fulcrum means associated with said frame adjacent said slot and received in the bight between said angularly disposed portions for permitting said portions to shift about said fulcrum in the slot, and resilient means acting between said frame and said second portion for urging said bight against the fulcrum, said resilient means comprising a compression spring urging said second portion laterally outwardly of said slot to hold the end section against the fulcrum.

3. A rake comprising a frame having a plurality of tines projecting therefrom and disposed longitudinally of said frame, each tine having an inner section comprising portions extending through said frame, said frame being slotted to receive said sections, each section comprising one portion extending through said slot in a predetermined direction and a second portion extending from said first named portion at a diverging angle with respect thereto and projecting through said slot, fulcrum means associated with said frame adjacent said slot and received in the bight between said angularly disposed portions for permitting said portions to shift about said fulcrum in the slot, and resilient means acting between said frame and said second portion for urging said bight against the fulcrum, said resilient means comprising a helical compression spring embracing said second portion and urging said second portion laterally outwardly of said slot to hold the end section against the fulcrum.

4. A rake comprising a frame and a plurality of outwardly projecting tines disposed longitudinally of said frame, said frame having a slot to receive the inner section of each tine, said inner section comprising a first portion extending through said slot, said first portion terminating in a second portion extending at a diverging angle to said first named portion and projecting through said slot, fulcrum means disposed between said angularly extending portions, and resilient means operatively acting on said second portion to urge said portion laterally outwardly of said slot while holding said first portion against said fulcrum means.

5. A rake comprising a frame and a plurality of outwardly projecting tines disposed longitudinally of said frame, said frame having a slot to receive the inner section of each tine, said inner section comprising a first portion extending through said slot, said first portion terminating in a second portion extending at a diverging angle to said first named portion and projecting through said slot, fulcrum means disposed between said angularly extending portions, and resilient means operatively acting on said second portion to urge said portion laterally outwardly of said slot while holding said first portion against said fulcrum means, said fulcrum means being disposed at a portion intermediate the length of said slot and being adjustable relative to the frame for varying the effective length of said portion for limiting the angular shifting movement of the tine with respect to the fulcrum.

6. A rake comprising a frame and a plurality of outwardly projecting tines disposed longitudinally of said frame, said frame having a slot to receive the inner section of each tine, said inner section comprising a first portion extending through said slot, said first portion terminating in a second portion extending at a diverging angle to said first named portion and projecting outwardly through said slot, fulcrum means disposed between said angularly extending portions, and resilient means operatively acting on said second portion to urge said portion laterally outwardly of said slot while holding said first portion against said fulcrum, said fulcrum comprising abutment means operatively mounted on said frame for selective shiftable movement for selectively varying the effective length of the fulcrum opposite said slot for determining the degree of angular movement of each tine about the fulcrum.

7. A rake comprising a frame having a plurality of longitudinally disposed tines projecting outwardly therefrom, said frame having a wall with tine-receiving slots therein, and a fulcrum means disposed intermediate of each of said slots, each of said tines having an inner section comprising a first portion projecting into one of said slots on one side of said fulcrum and a second angularly diverging portion extending beyond said slot on the other side of the fulcrum means, and resilient means operatively acting between said frame and said second portion for urging said portions against the fulcrum, said portions being arcuately shiftable in said slot and about said fulcrum means against the tension of said resilient means.

8. A rake construction as defined in claim 7, wherein said fulcrum means is relatively shiftable to selectively occupy a section of varying length with respect to the length of the slot for limiting the said arcuate shiftable movement of the tine with respect to the fulcrum.

9. A rake construction as defined in claim 7, wherein said resilient means comprises a compression spring adapted to be compressed in one arcuate shiftable position of the tine to form a relatively rigid abutment.

HOMER T. JENKINS.